(12) United States Patent
Hinc (10) Patent No.: US 7,343,952 B2
(45) Date of Patent: Mar. 18, 2008

(54) APPARATUS FOR MANUFACTURING A REINFORCEMENT FOR A TIRE, COMPRISING A GUIDE RING

(75) Inventor: Henri Hinc, Saint Beauzire (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 474 days.

(21) Appl. No.: 11/187,787

(22) Filed: Jul. 22, 2005

(65) Prior Publication Data

US 2006/0011286 A1 Jan. 19, 2006

Related U.S. Application Data

(63) Continuation of application No. PCT/EP2004/000284, filed on Jan. 16, 2004.

(30) Foreign Application Priority Data

Jan. 23, 2003 (FR) .................................. 03 00753

(51) Int. Cl.
*B29D 30/16* (2006.01)
(52) U.S. Cl. ...................................... 156/397; 156/398
(58) Field of Classification Search ................ 156/117, 156/123, 133, 135, 397, 398, 173, 175, 177
See application file for complete search history.

(56) References Cited

U.S. PATENT DOCUMENTS

| 3,082,140 A | 3/1963 | Vanzo ........................ 156/175 |
| 5,453,140 A | 9/1995 | Laurent et al. .............. 156/117 |
| 5,616,209 A | 4/1997 | Laurent et al. .............. 156/397 |
| 6,328,836 B1 | 12/2001 | Ogawa ........................ 156/117 |
| 6,463,978 B2 | 10/2002 | Mayet ........................ 156/397 |
| 2001/0020518 A1 | 9/2001 | Mayet ........................ 156/397 |
| 2003/0019565 A1* | 1/2003 | Mayet ........................ 156/117 |
| 2004/0108073 A1 | 6/2004 | Mayet ........................ 156/397 |

FOREIGN PATENT DOCUMENTS

| EP | 0 580 055 A1 | 1/1994 |
| EP | 1 122 057 A2 | 8/2001 |
| EP | 0 962 304 B1 | 3/2004 |
| FR | 2848141 | 6/2004 |

* cited by examiner

*Primary Examiner*—Geoffrey L. Knable
(74) *Attorney, Agent, or Firm*—Fitzpatrick, Cella, Harper & Scinto (57) ABSTRACT

The apparatus for manufacturing a reinforcement for a tire comprises an eyelet 60 through which the cord 4 can slip; the eyelet 60 is carried by a drive mechanism 3. A guide ring 5 is positioned relative to a main arm 31 in such a manner that this passes through the ring during its cyclical movement. The ring comprises a slot 54 through which the cord passes. The ring 5 comprises a base 50, two lateral walls 51 which are rigidly connected to the base and which are disposed on either side thereof, two deflectors 52 each rigidly connected to one of the lateral partition walls disposed at the end thereof opposite the base, the two deflectors being oriented towards one another and each ending with a lip 53, the lips being of similar and opposite shapes, the slot 54 being defined by the lips of the deflectors.

14 Claims, 6 Drawing Sheets

APPARATUS FOR MANUFACTURING A REINFORCEMENT FOR A TIRE, COMPRISING A GUIDE RING

CROSS-REFERENCE TO RELATED APPLICATIONS

This application is a continuation of International Application No. PCT/EP2004/000284, filed Jan. 16, 2004, which claims priority to French Patent Application 03/00753, filed Jan. 23, 2003, both of which are incorporated herein by reference.

BACKGROUND OF THE INVENTION

1. Field of the Invention

The present invention relates to the manufacture of tires. More precisely, it relates to the laying down of cords to build up a tire reinforcement. More particularly, it proposes means suitable for manufacturing such a reinforcement on a form close to or identical to the shape of the internal tire cavity, i.e., a substantially toroidal shape, supporting the blank of a tire during its manufacture.

2. Description of the Related Art

In this technical field, methods and apparatuses are already known for integrating the manufacture of tire reinforcements with the assembly of the tire itself. This means that, rather than having recourse to semi-finished products, such as reinforcement plies, one or more reinforcements are created in situ while the tire is being manufactured, starting from a spool of cord. Amongst these methods and apparatuses, the solution described in U.S. Pat. No. 6,463,978 B2, which is incorporated herein by reference (and which is a counterpart to patent application EP 1 122 057), is well adapted to the formation of carcass reinforcements on a rigid core, whose outer surface corresponds substantially to the shape of the internal cavity of the finished tire. This comprises apparatuses in which the cord, configured to build up a carcass reinforcement, is laid down in adjacent hoops over a rigid core by a mechanism having at least two arms arranged in cascade. The arms perform a reciprocating movement around the core, so as to place one hoop at a time with each outward motion and one hoop with each return motion, with the intervention of suitable pressers to apply the ends of the hoops one by one to the rigid core. The core will have been coated in advance with uncured rubber according to the architecture of the tire to be manufactured, which has the advantageous property of making it possible to adhere the hoops sufficiently and to hold them in place at least for the purposes of manufacture.

The laying down of cords on the core is all the more precise in that the eyelet through which the cord passes comes as close as possible to the core while laying down the cord. In certain embodiments of this invention, one is led to add at least a third arm in order to get closer to the core in the region of the base of the bead.

SUMMARY OF THE INVENTION

The object of the present invention is to improve the operating precision of a system with an oscillating arm, of which one end supplies a cord via an eyelet or via a cord outlet aperture at the end of the arm, of the type described in U.S. Pat. No. 6,463,978, whilst allowing the cord depositing elements to operate at high speeds. The aim of the invention is to obtain good control of the trajectory of cord laying down on the form, which acts as a manufacturing support for a tire, by a suitable deviation of the cord, rather than modifications to the movements of the drive mechanism of the depositing elements or the movements of the form.

The invention proposes an apparatus for manufacturing a tire reinforcement, which apparatus is configured to manufacture a reinforcement built up from a cord, the apparatus being configured to be used in cooperation with a substantially toroidal form which rotates about an axis of rotation, having a substantially median plane perpendicular to the axis of rotation, on which form the reinforcement is built up by laying down hoops of the cord along a desired trajectory for the cord on the surface of the form, the apparatus comprising:

a cord depositing element through which the cord can pass;

a drive mechanism for transporting the depositing element in a cyclical motion substantially within a plane of motion in a reciprocating manner, the cyclical motion turning about a central space configured to receive the form, the motion bringing the depositing element in consecutive cycles into the vicinity of each of the ends desired for the cord in the trajectory, the drive mechanism comprising at least one main arm supporting the depositing element;

pressers close to each of the ends of the trajectory in order to apply the cord to the form at least at the ends of the trajectory; and at least one pair of deflectors disposed opposite one another, the deflectors each ending with a lip, the lips defining a slot, the at least one pair of deflectors cooperating with only one side, axially, of the form, the deflectors being disposed so as to receive the cord brought by the cord depositing element from the side opposite the central space and to guide the cord on one side of the form in a trajectory defined by the contour of the lips and to allow the cord to pass between the lips and towards the central space.

The role of the deflectors is to facilitate precise laying down of the cord relative to the manufacturing form, in particular by bringing close to the form the slot, which is the only path by which the cord can escape from the deflectors. The movement of the drive mechanism brings about a certain tension of the cord between the form on which it is adhered and the depositing element, generally an eyelet through which the cord is threaded.

Preferably, the deflectors are mounted on a positioning mechanism, which makes it possible to impart to them small relative movements relative to the form in synchronization with the rotation thereof, so as further to improve the depositing precision of the cord by controlling one additional degree of freedom of positioning. Preferably, the apparatus comprises two pairs of deflectors, each acting on only one side, axially, of the form. When there are two pairs of deflectors, one for each side, then each of the pairs of deflectors is supported by its own positioning mechanism, which makes it possible to guide the cord precisely in each of the sidewalls, and in particular to use one of the deflectors as a gauge ensuring a certain spacing between adjacent sections of cord in the sidewalls. It is in fact particularly important to control the position of the carcass cords in the sidewalls and at the shoulder of the tire well.

The invention extends also to a method of manufacturing a reinforcement for a tire from a cord supplied continuously and upon demand by a suitable cord distributor, using a revolving form which has an axis of rotation and on which the reinforcement is built up gradually. The method comprises a stage for depositing on the form a layer of uncured rubber at least in the regions for anchoring the ends of the reinforcement, and in which the form is driven in rotation at a speed which is always non-zero, the cord proceeding from the distributor being threaded in a depositing element, synchronously with rotation of the form. The depositing element in which the cord is threaded is made to make a reciprocating movement around the form, so as to deposit the cord gradually on the form, the reciprocating movement making the depositing element pass—in a phase of movement towards the anchoring region at the base of the sidewall—in front of a guide device comprising two adjacent deflectors separated by a slot, the guide device being disposed opposite at least one shoulder, the cord passing through the slot, and the cord is temporarily pressed against the form in the anchoring region. The reciprocating movement makes the depositing element pass again in front of the guide device in a phase of movement returning from the anchoring region, the cord passing through the slot after each passage. The guide device is moved circumferentially and synchronously with the rotation of the form in order to control the arrangement of the cord on the form. The movements indicated above are repeated until the desired number of sections are deposited on the form surface according to the desired arrangement of the cord.

We refer the reader to U.S. Pat. No. 6,463,978, cited above, since the present invention proposes to supplement what is therein disclosed. This reference to the prior art is not limiting, however, the invention having a wider application. The eyelet or outlet aperture of the cord or any equivalent element will be referred to as the "depositing element", this being set in motion by a drive system comprising at least one oscillating arm, imposing at its end delivering the cord a flying "path" about the tire manufacturing form. A suitable system for driving the depositing element is for example the oscillating arm system disclosed in U.S. Pat. No. 6,463,978, cited above. The suitable system makes the cord depositing element and at least the arm supporting the same follow directly a movement substantially within one plane—referred to below as the plane of motion—perpendicular to the geometric axis of rotation of the arm(s).

As for the pressing devices, these must be positioned in a suitable manner to act as described in U.S. Pat. No. 5,453,140, which is incorporated herein by reference (and which is a counterpart to patent application EP 0 580 055). It should be borne in mind that they may both comprise a fork and a hammer movable between a retracted position (remote from the form) and an extended position (in contact with the form). They permit the formation of a loop and the laying down thereof on the form.

It should be borne in mind first of all that, as in U.S. Pat. No. 6,463,978, already cited, the term "cord" must be taken in a very general sense, including, for example, a monofilament, a multifilament, an assembly such as a cable or yarn, or a small number of grouped cables or yarns, whatever the kind of material, and whether the "cord" is covered in advance with rubber or not. In the present document, the term "hoop" is used to designate a section of cord extending from one particular point to another in the reinforcement. The entirety of these hoops placed right around the circumference of the tire constitutes all together the reinforcement per se. A hoop in the sense defined herein may be part of a carcass, or a crown reinforcement, or any other type of reinforcement. These hoops may be separated by cutting the cord during laying down, or may be connected together in the finished reinforcement, e.g., by loops.

In principle, the invention relates to the continuous laying down of a reinforcing cord, in a configuration as close as possible to the configuration in the finished product. The cord is supplied on demand by a suitable distributor comprising for example a spool of cord and if necessary a device for controlling the tension of the cord taken from the spool. The apparatus for manufacturing a reinforcement from a single cord cooperates with a form (rigid core or reinforced membrane) on which the tire is manufactured. It does not matter that the reinforcement is manufactured in plural consecutive rotations of the form in front of the depositing elements described, with cutting of the cord or not between consecutive rotations.

When the positions or directions are defined with the words "radially," "axially," or "circumferentially," or when speaking of radii, the point of reference is the form on which the tire is being manufactured, or the tire itself. The geometric axis of reference is the axis of rotation of the form. The median plane $\pi_M$ is a plane perpendicular to the axis of rotation of the form, shown for example in FIG. 1. The median plane $\pi_R$ is the plane containing the axis of rotation of the form and is for example the plane of FIG. 2. The term "portion" is used to designate the path of the cord between the place where it leaves the depositing element and the place where it joins the surface of the form.

Furthermore, the cord depositing elements described here also make it possible to build up a reinforcement, e.g., a carcass reinforcement, in which the pitch of laying down of the cord is variable. "Pitch of laying down" is understood to mean the distance resulting from the sum of the spacing between two adjacent cords and the diameter of the cord. It is well known that for a carcass reinforcement, the spacing between cords varies according to the radius at which it is measured. It does not involve the variation being discussed here, but a variable pitch at a specified radius. For this, it suffices to vary the speed of rotation of the form according to any suitable equation without changing the rate of operation of the depositing element. Thus a tire is obtained whose carcass reinforcing cords, e.g., for a radial carcass, are disposed at a pitch having a controlled variation for a specified radial position.

BRIEF DESCRIPTION OF THE DRAWINGS

All aspects of the invention will be explained in the following description, with reference to the attached drawings showing.

DETAILED DESCRIPTION OF THE PREFERRED EMBODIMENTS

Figure 1:
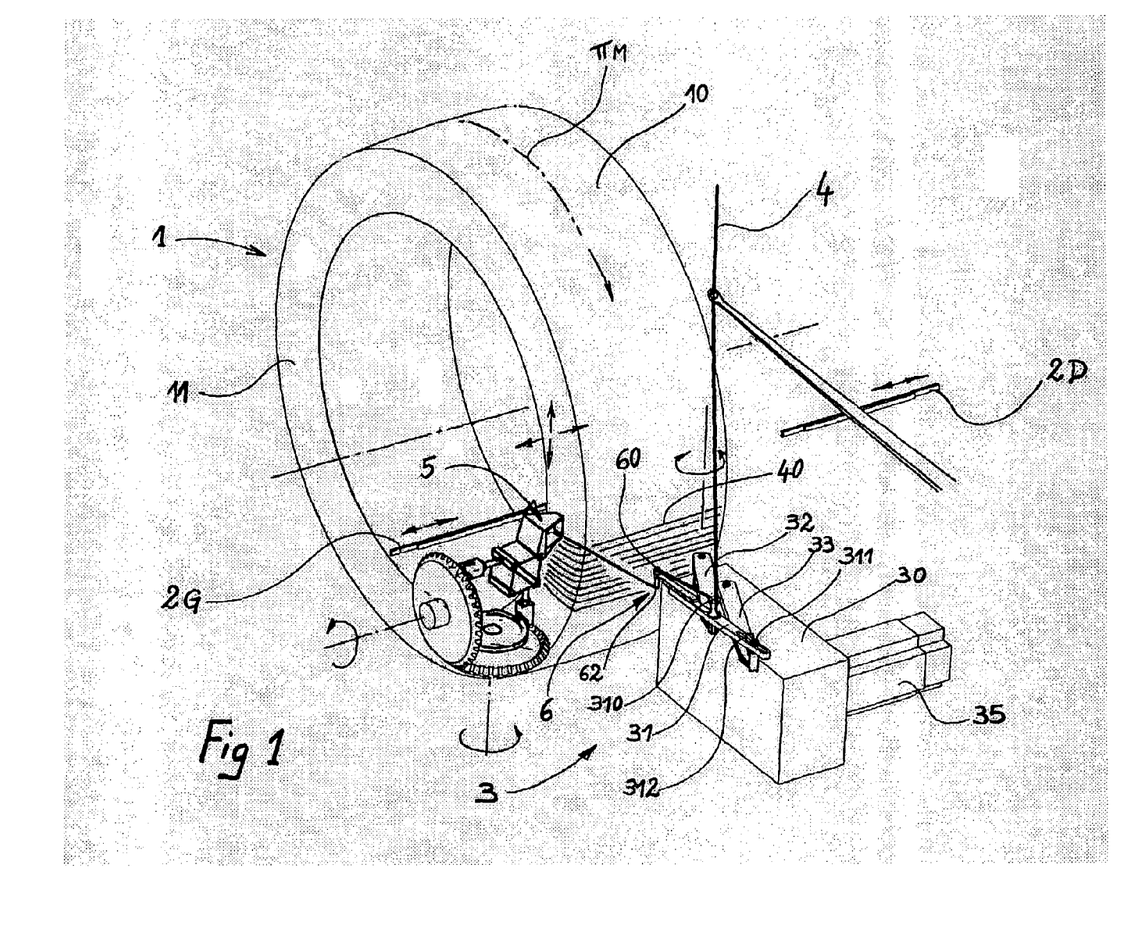
FIG. 1 is a perspective diagram showing an embodiment of apparatus according to the invention.

In FIG. 1 (as well as for all the examples described, without being limiting), the form is a core 1 (which is rigid and capable of being dismantled) defining the geometry of the inner surface of the tire. This is covered with rubber 10 (see FIG. 2), e.g., by a layer of sealing rubber with a butyl rubber base, and with a layer of rubber for anchoring the carcass cords to the core during manufacture, and then these layers are coated in the vulcanized tire. The rubber 10 covering the core 1 makes it possible to hold the cord 4 on the core 1 as it is deposited by a depositing element 6, thanks to adhesion. The depositing element illustrating the invention is an eyelet 60 through which the cord 4 is threaded. The core 1 is driven in rotation by any suitable means (not shown).

The present invention uses a drive mechanism 3 for the eyelet 60 comprising multiple arms, quite comparable to that described in U.S. Pat. No. 6,463,978. The present invention is distinguished from this reference in that it is possible to bring the eyelet 60 very close to the core 1 without having to have three arms in series, and therefore without having to control the movement of the third arm of those in cascade arranged in series. The space in which the drive mechanism operates typically has a substantially median plane perpendicular to the axis of rotation which, particularly in applications of the invention where axially symmetrical carcasses are constructed continuously from one bead to the other, corresponds substantially to the median plane of symmetry of the core 1.

In FIG. 1, the drive mechanism 3 with multiple arms is shown mounted on a plate 30. The drive mechanism 3 with multiple arms comprises a main arm 31 directly bearing the eyelet 30 at its end. The eyelet 60 forms, in all the examples described, the element for depositing the cord 4 (without being limiting). It should be borne in mind that the drive mechanism 3 with multiple arms performs the function of the chain mechanism in U.S. Pat. No. 5,453,140, and that the pressing devices 2G and 2D are positioned suitably so as to perform the function described in U.S. Pat. No. 5,453,140. By means of a presser, a loop is created with the cord, and the loop is pressed against the form at each end of the final trajectory.

The eyelet 60 is similar to that described in U.S. Pat. No. 6,463,978. It comprises an outlet aperture 62, which moves in the plane of movement of the depositing element. It is expedient to form the edges of the aperture 62 carefully in order not to damage the cord 4, since the portion of the cord emerging therefrom is generally disposed substantially in the plane of motion, i.e., in the plane which is perpendicular to the walls of the eyelet 60. Alternatively, the eyelet may be oriented close to the average orientation of the cord emerging from the eyelet.

The main arm 31 is formed on the plate 30 by means of a front auxiliary arm 32 and a rear auxiliary arm 33. The front auxiliary arm 32 is mounted on a shaft 320 and the rear auxiliary arm 33 is mounted on a shaft 330 (see FIG. 3). The main arm 31 is mounted on the front auxiliary arm 32 by means of an axle 310 disposed at the geometric center of rotation, forming the articulation between the main arm 31 and the front auxiliary arm 32. The axle 310 is surmounted by an eye in which the cord 4 is threaded. The axle 310 is furthermore mounted in the central part of the main arm 31. The instantaneous center of rotation of the main arm 31 is therefore located at the end of the front auxiliary arm 32. A perforation 312 is formed on the main arm 31. The perforation 312 is located on the side of the geometric center of rotation which opposes the eyelet 60. A dog point 311 is mounted at the end of the rear auxiliary arm 33. The dog point 311 penetrates the perforation 312 of the main arm 31 in order to guide the main arm 31.

In the arrangement described in U.S. Pat. No. 6,463,978, the drive mechanism with arms arranged in cascade formed a parallelogram (shafts 31, 32 and 34), the shafts 31 and 34 being of equal length and having inevitably identical movements. Arm 32, which is carried by the arms 31 and 34, moves so as to remain parallel to its initial position (all references underlined and cited at the start of this paragraph refer back to U.S. Pat. No. 6,463,978). On the contrary, in the present invention, by virtue of the installation of a cam and cam follower function, realized by the perforation 312 formed at one end of the main arm 31 and the dog point 311, the front auxiliary arm 32 and the rear auxiliary arm 33 can be of different lengths (i.e., the functional length, as measured between the center of rotation of the auxiliary arm in question and the dog point 311 or the axle 310), and/or the front 32 and rear 33 auxiliary arms may have oscillatory movements of different amplitudes. Functionally, the invention makes possible an arrangement whereby, during its movement, the main arm 31 does not remain parallel to its initial position. It can adopt a certain incline with respect to the median plane $\pi_M$, as is shown in particular in FIG. 2, which makes it possible to bring the eyelet 60 close to the bead of the prospective tire, even if the manufacturing form is narrower at the level of the bead than half-way up the sidewall.

Figure 2:
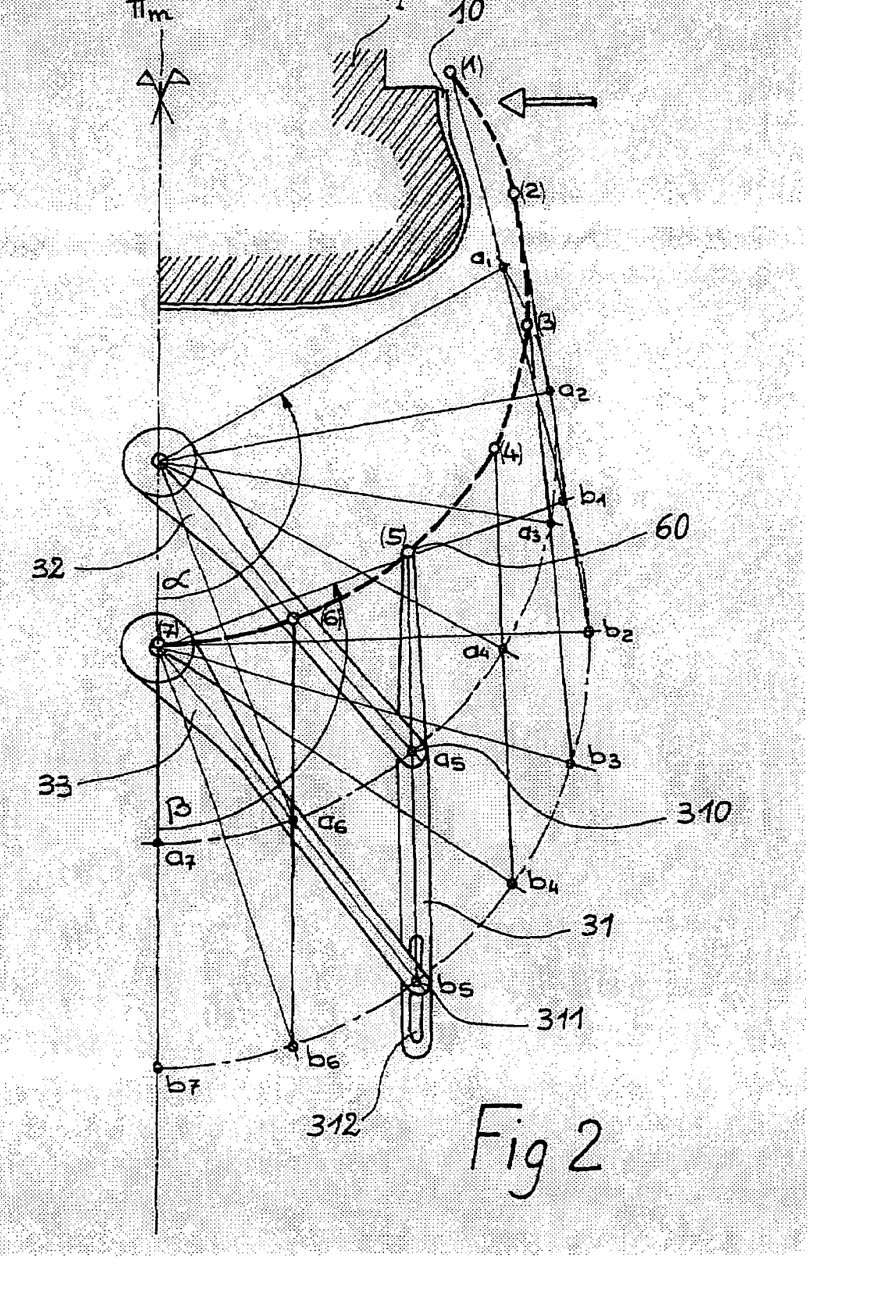
FIG. 2 shows the operation of a mechanism of the apparatus shown in FIG. 1.

The choice of degree of incline, i.e., of approach to the region of the prospective bead, is obtained by acting on the respective lengths of the auxiliary arms and/or the respective amplitudes of the oscillatory movements of the auxiliary arms. In FIGS. 1 and 2, the illustration shows a solution where the auxiliary arms 32 and 33 have slightly different movements. The auxiliary arms do not carry out a continuous rotation, but oscillate, each within (different) limits of an arc of less than 360°, the precise values depending on the exact composition of the drive mechanism with multiple arms 3 and of the application required. The shafts 320 and 330 are connected together by a mechanism inside the plate 30, such that the shaft 320 can oscillate with an amplitude of for example about 240°, whereas the shaft 330 can oscillate with an amplitude of for example about 220°. The two shafts are controlled by the same motor 35.

FIG. 2 shows diagrammatically the movements of the drive mechanism 3 with multiple arms. The main arm 31, the front auxiliary arm 32 and the rear auxiliary arm 33 are shown. The curve shown with a heavy broken line and bearing the references (1), (2), (3), (4), (5), (6) and (7) shows the movement of the eyelet 60. The curve in a dot-dash line bearing the references a1, a2, a3, a4, a5, a6 and a7 shows the movement in space of the axle 310, i.e., also the movement in space of the center of rotation of the main arm 31. Finally, the curve bearing the references b1, b2, b3, b4, b5, b6 and b7 shows the movement in space of the dog point 311. It can be clearly seen in FIG. 2 that the front auxiliary arm 32 and the rear auxiliary arm 33 are of equal length (this is only an example, and is not limiting). As the amplitude of their movement is not identical, this will result in a variable incline of the main arm 31.

The mechanism is mounted so that there is a phase of motion in which the auxiliary arms are exactly aligned on the plane $\pi_M$. If the axle 310 is at the point a7 and the dog point 311 is at the point 67 (this is not the position shown in FIG. 2), then the main arm 31 will be disposed exactly on the axis of symmetry of the Figure, and exactly aligned with the front 32 and rear 33 auxiliary arms. Since the amplitude of movement of the rear auxiliary arm is slightly less than the amplitude of movement of the front auxiliary arm, as the front 32 and rear 33 auxiliary arms rotate from their position in which they merge with the axis of symmetry of the Figure, to join the extreme position of their oscillatory movement, initially the main arm 31 will incline relative to the axis of symmetry of the Figure in such a manner that the eyelet 60 moves away from the axis of symmetry of the Figure slightly more than the axle 310 and even more than the place in the perforation 312 where the dog point 311 is.

Then there is an intermediate position of the front 32 and rear 33 auxiliary arms for which the main arm 31 is again exactly parallel to the plane of symmetry of FIG. 2. Finally, when the front 32 and rear 33 auxiliary arms approach the limit of oscillation, the main arm 31 inclines so that the eyelet 60 is closer to the axis of the Figure than the axle 310 and even closer than the dog point 311. By choosing correctly the relative amplitudes of the movements of the front 32 and rear 33 auxiliary arms, it can be arranged that the eyelet 60 is disposed at a location extremely close to the bead of the prospective tire.

All the details of construction of a drive mechanism with multiple arms, or which one arm comprises a perforation, can be found in U.S. Patent Application Publication No. 2004/0108073 A1, which is incorporated herein by reference (and which is a counterpart to patent application FR2002/15307). The present description only mentions certain aspects which help to explain the present invention without any of these aspects having a limiting effect.

The drive mechanism 3 described above makes it possible to pass the eyelet 60 through a guide ring 5, forming deflectors separated by a slot 54 in order to allow the cord 4 to escape. The movement of the depositing elements of the cord is shown particularly in FIG. 3, and the ring 5 is illustrated in detail in FIG. 4.

Figure 4:
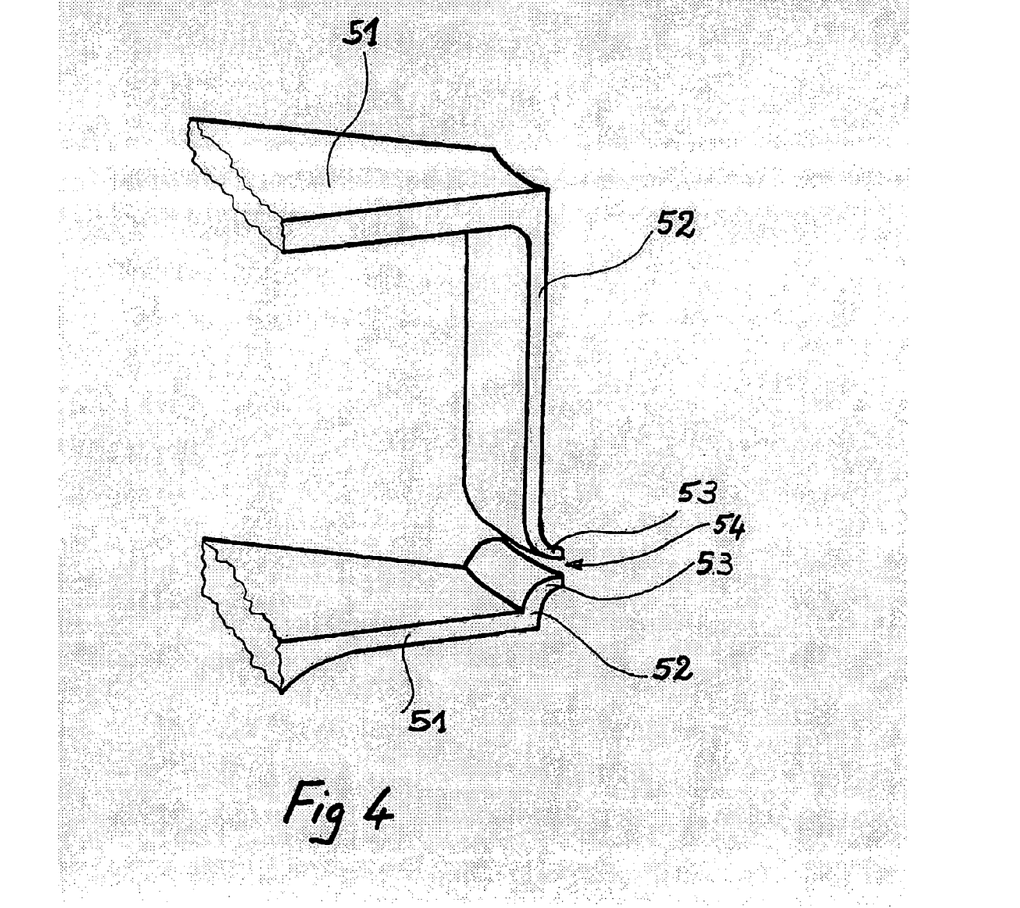
FIG. 4 shows an enlargement showing in more detail an element of the apparatus.

The ring 5 comprises a base 50 and two lateral walls 51. The two lateral walls 51 are rigidly connected to the base 50 and are disposed on either side thereof. A deflector 52 is rigidly connected to each of the lateral walls. The deflectors are disposed at the end thereof which is opposite to the base. The two deflectors 52 are oriented towards one another, and each one ends with a lip 53, the lips being of similar and opposite shapes. The slot 54 is defined by the lips 53 of the deflectors 52. Each of the lips 53 is concave and moves gradually away from the base 50, so as to create a slide face guiding the cord 4 towards the slot 54. Preferably, each of the lips 53, or more precisely the end thereof, lies substantially within one plane, in so far as it is desired to deposit hoops 40 of cord along a trajectory which is itself within one plane.

Furthermore, in order to promote rigorous guiding of the cord 4 on to the surface of the core 1, it is desirable that the lips 53 follow the contour of the surface of the core 1. That is why, preferably, each lip 53 has a contour which is parallel to the surface of the form on which the tire is constructed, when this form is considered at the level corresponding to the sidewall of the prospective tire.

In FIG. 2, a sector D shows the space within which each of the deflectors preferably moves. Thus, preferably, each deflector is disposed radially beyond the equator E of the form 1 with which it is configured to cooperate. In the same way, preferably, each of the deflectors is disposed axially on one side of the median plane $\pi_M$ of the form 1. Furthermore, preferably, each of the lips is substantially contained in a plane (here it is a radial plane, i.e., the plane of FIG. 2). For reference, the equator E corresponds to the point of maximum width of the form 1. It may further be noted that each deflector is preferably disposed opposite a shoulders of the form 1 with which it is configured to cooperate.

Only one pair of deflectors has been shown by illustrating in FIG. 2, in particular an axial half of the form 1 and of the path in space of the drive mechanism 3 with multiple arms. It is known however that most tires are symmetrical. In this case, the person skilled in the art will be easily able to install identical or comparable elements in the other axial half, but the invention is in no way limited to apparatus which is symmetrical or quasi-symmetrical with respect to a median plane $\pi_M$. The sections of cords could be installed between a bead and an edge of the tread region of the tire, for example if the carcass is in fact made by two semi-carcasses. It may be useful then to guide the cord between the ends of the laying down trajectory by the means taught in the present invention.

A ring 5 such as described above may be positioned fixed in space just opposite the sidewall 11 of the core 1 in order to guide the cord 4 precisely even when the apparatus is operating at very high laying down rates. The guide ring 5 is positioned and oriented relative to the main arm in such a manner that the main arm penetrates the ring during its cyclical movement. Thus, even in a very simple embodiment, the invention makes it possible to improve the quality of manufacture of the tires and the consistency of operation in the long term. In short, this makes for a sturdy manufacture.

The illustration of the invention shows means for varying the positioning in space of the guide ring 5. Various versions can be distinguished according to the level of sophistication: either only the circumferential positioning of the slot 54 is acted on relative to the core 1, or the closeness of the guide ring 5 relative to the core 1 is acted on, or both. The following describes a support 7 associated with means for variable positioning of the guide ring 5 and giving rise to the highest level of sophistication, without being limiting.

Figure 3:
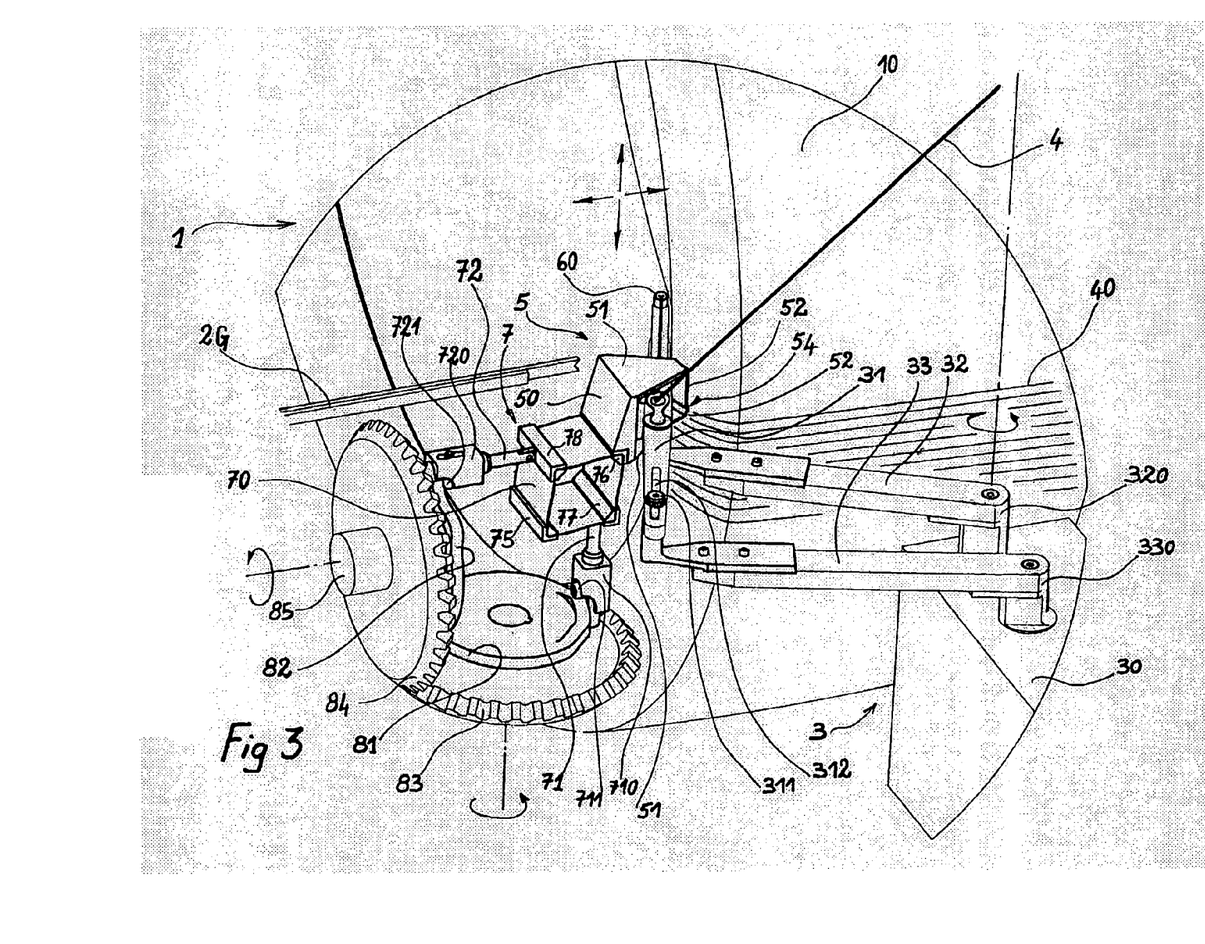
FIG. 3 shows an enlargement of part of the apparatus shown in FIG. 1, taken at a further stage of operation.

In particular, it can be seen from FIG. 3 that the base 50 of the ring 5 is mounted on a support 7. This support 7 is formed by four plane, flexible partition walls 70. These plane, flexible partition walls 70 are connected by four angle steels 75, 76, 77 and 78 and are arranged in a quadrilateral when viewed in section by a plane parallel to the axis of rotation of the core 1. The angle steel 75 acts as a reference and is fixed in space. It is connected to the frame of the apparatus, without the means of connection being shown in the drawing, for the sake of clarity. The ring 5 is fixed rigidly to the angle steel 76 diametrically opposite to the reference angle steel 75.

A first jack 71 can be seen mounted in a jacket 710 fixed in space (the jacket 710 is connected to the apparatus frame in a manner which it is not helpful to show). A second jack 72 can be seen mounted in a jacket 720 fixed in space (the jacket 720 is connected to the apparatus frame in a manner which is not depicted). Each of the first and second jacks 71 and 72 is connected on the one hand to a roller 711 and 721, respectively, and on the other hand to the angle steels 77 and 78, which are diametrically opposed and are located on the diagonal not comprising the angle steel 75.

Each of the rollers 711 and 721 cooperates with a cam 81 and 82, respectively. Each cam is mounted on a toothed wheel 83, 84, respectively, the two toothed wheels being mounted rotatably in respective bearings fixed in space. A restoring spring, not shown, is biased permanently to brace the rollers 711 and 721 against respective cams 81 and 82. A shaft 85 is coupled to one of the toothed wheels and is driven in rotation in a suitable manner to control the movement of the first and second jacks 71 and 72 via the movement of the cams 81 and 82.

The first jack 71 is thus capable of imposing translation perpendicular to the plane containing the lips 42, i.e., translation perpendicular to the plane of motion. The second jack 72 is thus capable of imposing translation parallel to the plane of motion, i.e., parallel to the axis of rotation of the core 1.

Figure 5:
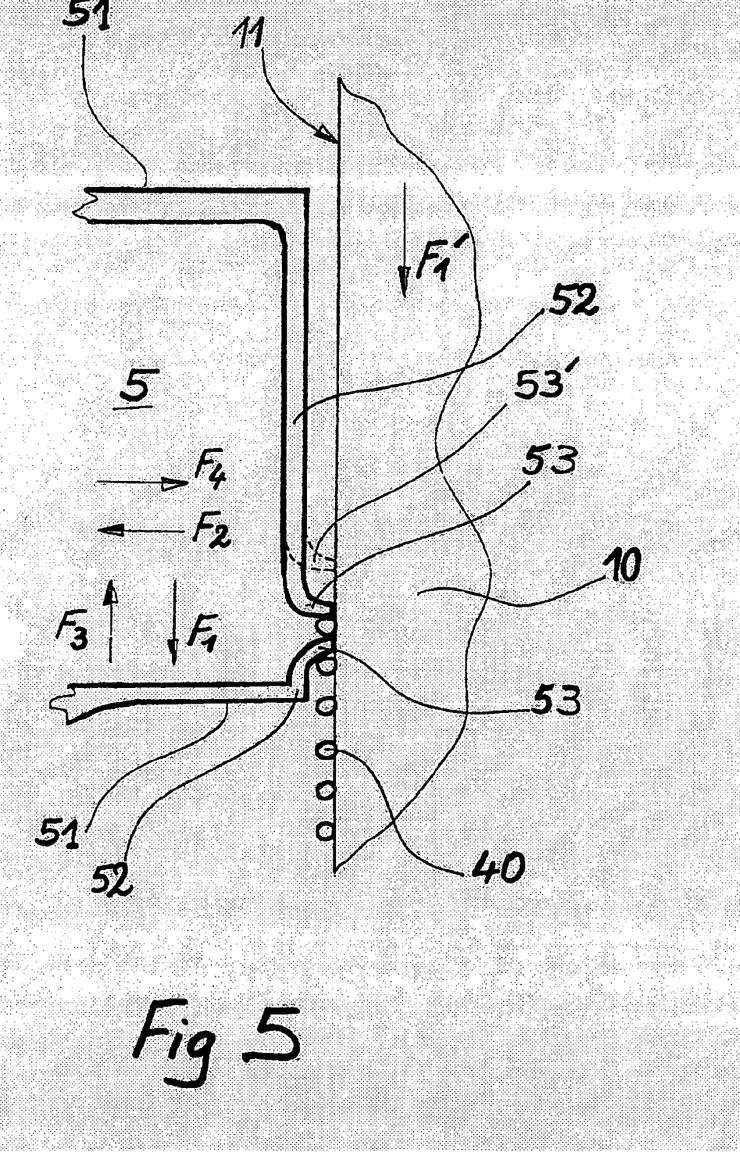
FIG. 5 shows the intervention of a specific element of the present invention.

In FIG. 5, the intervention of the guide ring can be seen more clearly. It should be borne in mind that the core 1 is rotating continuously in the direction of the arrow F1'. Sections 40 have already been deposited on the core 1. In one phase of operation, the ring 5 is in the position shown in solid lines. The lips 53 are very close to the layer of rubber 10 in which the core 1 is coated. The ring 5 is translated perpendicularly (see arrow F1) to the plane of motion of the eyelet 60, so as to follow the movement of the core 1 represented by the arrow F1'. At a certain moment, the cord 4 passes through the slot 54. Then the ring 5 is removed from the core 1 as is shown by the arrow F2, whilst following the movement represented by the arrow F1, so as to separate from the cord 4 just placed on the core without moving the same relative to the core 1. Then the ring 5 is displaced according to the arrow F3 (parallel to the sidewall 11 of the core 1), then the ring is brought towards the core 1, as is shown by the arrow F4, then it resumes its movement F1 of accompanying the core while the cord passes again through the slot 54 during laying down of the next section 40.

When there are two pairs of deflectors, one for each side, in the light of the above explanation, the movements taught, in particular the movements F2 and F4, are facilitated if each pair of deflectors is supported by its own positioning mechanism. Further, it can be deduced from the configuration shown in FIG. 5 that one of the deflectors is used as a gauge ensuring a certain spacing between adjacent sections of cord in the sidewalls.

From these explanations, the person skilled in the art can easily trace the cams 81 and 82 which will impart to the jacks 71 and 72 the necessary movements. The system of cams and rollers configured to follow the profile of the cams is only one of the many ways of controlling the movement of the guide ring 5. Numerous other controls, mechanical or electrical, are conceivable.

The apparatus is controlled by a control (not shown) actuating a motorization system (of which the motor 35 is shown for example), which controls in synchronization the rotation of the form (core 1), the drive mechanism 3, the pressers 2D and 2G, and the movements of the ring 5. This makes it possible to carry out the general method discussed above. It should be emphasized in particular that the method comprises a phase in which the movement of the ring 5 follows the rotation of the form and, furthermore, another phase in which the movement of the ring 5 relative to the form is in the opposite direction relative to the rotation of the form. It should also be emphasized that the method comprises a phase in which the ring 5 moves towards the form in a movement parallel to the axis of rotation of the form, and furthermore a phase in which it moves away from the form in a movement parallel to the axis of rotation of the form. The phases of movements of the ring 5 relative to the movement of the form is preferably such that one of the lips 53 is disposed adjacent to the section 40 of cord 4 previously deposited. The thickness of the lip 53 advantageously determines the spacing between sections 40 of adjacent cords after laying down on the form.

The application illustrating the invention aims to manufacture a radial carcass. It therefore involves anchoring the hoops in each bead of the prospective tire, and of embodying a laying down which is as precise as possible in the sidewalls of the prospective tire. Hence the very particular orientation of the slot 54 (and of the plane of motion). However, other orientations are conceivable.

Figure 6:
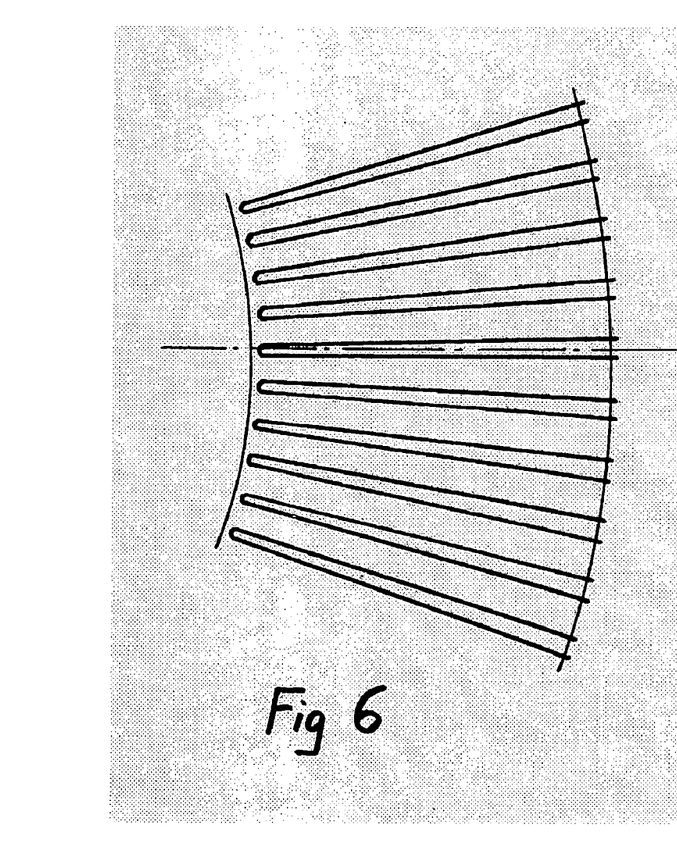
FIG. 6 shows a carcass reinforcement obtained with certain apparatuses of the prior art.
Figure 7:
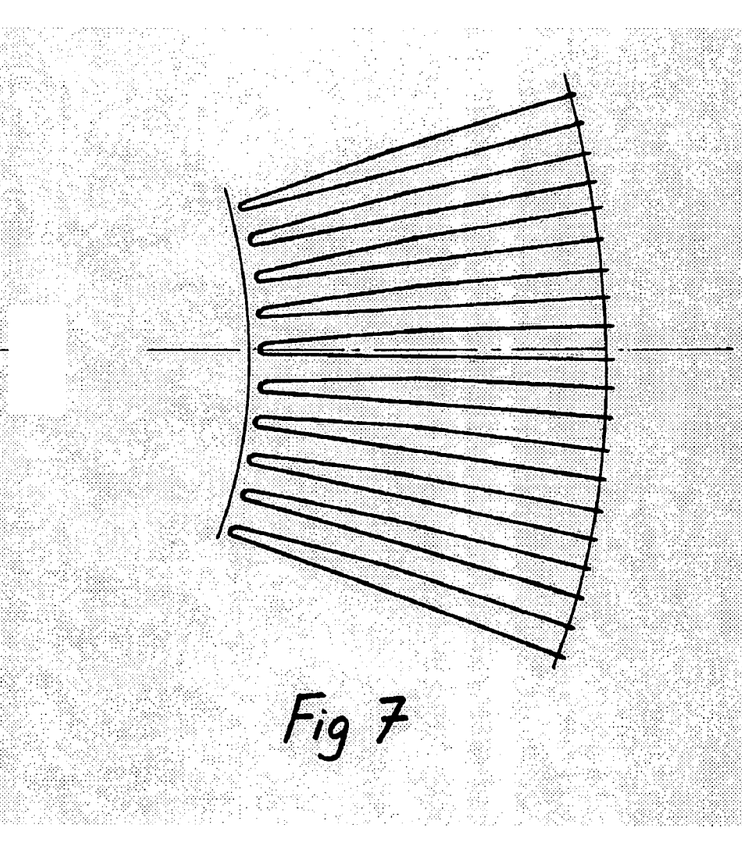
FIG. 7 shows a carcass reinforcement obtained with the invention.

FIG. 6 shows the arrangement of the different hoops of cord 4 deposited on the form with a drive mechanism for the specified depositing element, but without using the guide ring 5 according to the invention. FIG. 7 shows the result obtained with the same drive system of the depositing element and with the intervention of the guide ring 5 according to the invention. FIG. 7 shows that the spacing between the alternating passages of cord, i.e., the spacing between the adjacent hoops, is regular and constant in the region of intervention of the ring 5 (upper part of the sidewall), whereas in FIG. 6, the various hoops of cord 4 remain grouped in twos.

What is claimed:

1. An apparatus for manufacturing a tire reinforcement, which apparatus is configured to manufacture a reinforcement built up from a cord, the apparatus being configured to be used in cooperation with a substantially toroidal form which rotates about an axis of rotation, having a substantially median plane perpendicular to the axis of rotation, on which form the reinforcement is built up by depositing hoops of the cord along a desired trajectory for the cord on the surface of the form, the apparatus comprising:

a cord depositing element through which the cord can pass;

a drive mechanism for transporting the depositing element in a cyclical motion substantially within a plane of motion in a reciprocating manner, the cyclical motion turning about a central space configured to receive the form, the motion bringing the depositing element in consecutive cycles into the vicinity of each of the ends desired for the cord in the trajectory, the drive mechanism comprising at least one main arm supporting the depositing element;

pressers close to each of the ends of the trajectory in order to apply the cord to the form at least at the ends of the trajectory; and at least one pair of deflectors disposed opposite one another, the deflectors each ending with a lip, the lips defining a slot, the at least one pair of deflectors cooperating with only one side, axially, of the form, the deflectors being disposed so as to receive the cord brought by the cord depositing element from the side opposite the central space and to guide the cord on one side of the form in a trajectory defined by the contour of the lips and to allow the cord to pass between the lips and towards the central space.

2. The apparatus according to claim 1, wherein a guide ring is positioned and oriented relative to the main arm so that the arm passes through the ring during its cyclical movement, the ring comprising a base, two lateral partition walls rigidly connected to the base and disposed on either side thereof, each of the at least one pair of deflectors being rigidly connected to one of the lateral partition walls and being disposed at an end thereof which is opposite to the base.

3. The apparatus according to claim 1, wherein the at least one pair of deflectors is supported by a positioning mechanism.

4. The apparatus according to claim 1, comprising two pairs of deflectors, each allocated to only one side, axially, of the form, and wherein each pair of deflectors is supported by its own positioning mechanism.

5. The apparatus according to claim 1, wherein each deflector is disposed radially beyond the equator and axially on one side of the median plane of the form with which it is configured to cooperate.

6. The apparatus according to claim 1, wherein each deflector is disposed opposite a shoulder of the form with which it is configured to cooperate.

7. The apparatus according to claim 1, wherein each of the lips is substantially contained within one plane and has a contour parallel to a portion of the surface of the form corresponding to the sidewall of a tire.

8. The apparatus according to claim 2, wherein the base is connected to a first jack configured to impose translation perpendicular to the lips and perpendicular to the plane of motion.

9. The apparatus according to claim 2, wherein the base is mounted on a support comprising four planar, flexible partition walls arranged in a quadrilateral, wherein the support is connected to a first jack capable of imposing translation perpendicular to the lips and to the plane of motion, and the support is connected to a second jack capable of imposing translation perpendicular to the lips and parallel to the plane of motion.

10. The apparatus according to claim 8 or 9, wherein the movement of each of the jacks is controlled by a cam.

11. The apparatus according to claim 8, wherein the ring is mounted on a support comprising planar, flexible partition walls arranged in a quadrilateral.

12. The apparatus according to claim 1, wherein the main arm directly supports the depositing element.

13. The apparatus according to claim 1, wherein the depositing element is an eyelet.

14. The apparatus according to claim 2, further comprising the form and a motorization system, wherein the motorization system synchronously controls the rotation of the form, the drive mechanism, the pressers, and the movements of the ring.

* * * * *

UNITED STATES PATENT AND TRADEMARK OFFICE
CERTIFICATE OF CORRECTION

PATENT NO. : 7,343,952 B2  Page 1 of 1
APPLICATION NO. : 11/187787
DATED : March 18, 2008
INVENTOR(S) : Henri Hinc It is certified that error appears in the above-identified patent and that said Letters Patent is hereby corrected as shown below:

COLUMN 3

Line 56, "yams," should read --yarns,--.

COLUMN 4

Line 47, "ings showing" should read --ings, of which--.

COLUMN 7

Line 20, "or" should read --or in--.
Line 66, "shoulders" should read --shoulder--.

Signed and Sealed this

Nineteenth Day of August, 2008

JON W. DUDAS
*Director of the United States Patent and Trademark Office*